US011349822B2

(12) United States Patent
Kashyap et al.

(10) Patent No.: US 11,349,822 B2
(45) Date of Patent: May 31, 2022

(54) RUNTIME ENCRYPTION PLUGIN FOR A KEY MANAGEMENT SYSTEM

(71) Applicant: Fortanix, Inc., Mountain View, CA (US)

(72) Inventors: Anand Kashyap, Los Altos, CA (US); Ambuj Kumar, Sunnyvale, CA (US); Jethro Gideon Beekman, San Francisco, CA (US); Jeffrey Seyfried, Cupertino, CA (US)

(73) Assignee: Fortanix, Inc., Mountain View, CA (US)

( * ) Notice: Subject to any disclaimer, the term of this patent is extended or adjusted under 35 U.S.C. 154(b) by 538 days.

(21) Appl. No.: 15/818,195

(22) Filed: Nov. 20, 2017

(65) Prior Publication Data

US 2019/0158474 A1    May 23, 2019

(51) Int. Cl.
*H04L 29/06* (2006.01)
*H04L 9/40* (2022.01)
*H04L 9/08* (2006.01)

(52) U.S. Cl.
CPC ............ *H04L 63/061* (2013.01); *H04L 9/088* (2013.01); *H04L 9/0877* (2013.01); *H04L 9/0897* (2013.01)

(58) Field of Classification Search
CPC . H04L 63/061; H04L 63/062; H04L 63/0823; H04L 63/06; H04L 63/126; H04L 9/3247; H04L 9/30; H04L 9/0877; H04L 9/14; H04L 9/0822; H04L 9/088; H04L 9/0897; H04L 9/0861; H04L 9/3263; H04L 9/3239; H04L 2209/12; H04W 12/06; H04W 12/04; G06F 21/32

USPC .......................................................... 713/164
See application file for complete search history.

(56) References Cited

U.S. PATENT DOCUMENTS

| | | | | |
|---|---|---|---|---|
| 6,839,437 | B1* | 1/2005 | Crane | G06F 21/602 380/277 |
| 7,363,361 | B2* | 4/2008 | Tewari | H04L 12/14 709/223 |
| 8,239,824 | B2* | 8/2012 | Cifra | G06Q 30/0284 717/109 |
| 8,484,464 | B2* | 7/2013 | Brown | G06F 11/1448 713/165 |
| 9,424,439 | B2* | 8/2016 | Tamayo-Rios | G06F 21/6272 |
| 9,532,005 | B2* | 12/2016 | Shamoon | H04N 21/2541 |
| 9,584,517 | B1* | 2/2017 | Roth | G06F 21/6209 |
| 9,887,836 | B1* | 2/2018 | Roth | H04L 9/0822 |
| 10,073,981 | B2* | 9/2018 | Arasu | G06F 21/72 |

(Continued)

OTHER PUBLICATIONS

Patrick Nohe, New Runtime Encryption solutions emerging to fill "Encryption Gaps", https://www.thesslstore.com/blog/runtime-encryption-gaps/, Jun. 20, 2018, pp. 1-8.*

*Primary Examiner* — Henry Tsang
(74) *Attorney, Agent, or Firm* — Lowenstein Sandler LLP

(57) ABSTRACT

A request may be received from an application for a performance of an operation associated with a cryptographic key that is stored at a secure enclave. A plugin of the secure enclave may be identified from the request for performance of the operation. The operation associated with the cryptographic key may be performed by using the plugin of the secure enclave to generate an output within the secure enclave. The output generated within the secure enclave and based on the plugin may be provided to the application.

20 Claims, 7 Drawing Sheets

(56) References Cited

U.S. PATENT DOCUMENTS

| | | | |
|---|---|---|---|
| 10,361,870 B2* | 7/2019 | Chow | G06Q 20/382 |
| 2004/0165721 A1* | 8/2004 | Sano | H04L 9/002 |
| | | | 380/28 |
| 2006/0156013 A1* | 7/2006 | Beeson | H04L 9/3247 |
| | | | 713/180 |
| 2006/0259769 A1* | 11/2006 | Goettfert | H04L 9/065 |
| | | | 713/168 |
| 2008/0022361 A1* | 1/2008 | Bharadwaj | H04L 9/0836 |
| | | | 726/2 |
| 2012/0084562 A1* | 4/2012 | Farina | H04L 63/12 |
| | | | 713/168 |
| 2014/0229737 A1* | 8/2014 | Roth | H04L 9/321 |
| | | | 713/176 |
| 2016/0036826 A1* | 2/2016 | Pogorelik | H04L 63/0428 |
| | | | 726/1 |
| 2016/0078203 A1* | 3/2016 | Moloian | G06F 21/31 |
| | | | 726/17 |
| 2016/0269364 A1* | 9/2016 | White | G06F 21/602 |
| 2016/0269370 A1* | 9/2016 | White | H04L 63/062 |
| 2016/0350561 A1* | 12/2016 | Poiesz | G06F 21/74 |
| 2016/0381005 A1* | 12/2016 | Vij | G06F 21/57 |
| | | | 726/7 |
| 2017/0109509 A1* | 4/2017 | Baghdasaryan | H04L 63/08 |
| 2017/0353319 A1* | 12/2017 | Scarlata | H04L 9/0866 |
| 2017/0357822 A1* | 12/2017 | Wei | H04L 9/0825 |
| 2017/0373844 A1* | 12/2017 | Sykora | H04L 9/3249 |
| 2018/0198610 A1* | 7/2018 | Mullins | H04L 9/0891 |
| 2018/0205711 A1* | 7/2018 | Kumar | G06F 21/602 |
| 2018/0247082 A1* | 8/2018 | Durham | H04L 9/0822 |
| 2018/0375639 A1* | 12/2018 | Lauter | H04L 9/008 |
| 2019/0044929 A1* | 2/2019 | Kashyap | H04L 9/3247 |
| 2019/0116619 A1* | 4/2019 | Hauck | H04L 9/3273 |

* cited by examiner

RUNTIME ENCRYPTION PLUGIN FOR A KEY MANAGEMENT SYSTEM

TECHNICAL FIELD

Aspects of the present disclosure relate generally to plugins, and more specifically, relate to a runtime encryption plugin for a key management system.

BACKGROUND

An application may utilize a cryptographic operation to be performed with data. For example, the data may be encrypted data that is to be decrypted or the data may be signed by a digital signature that is to be verified. In general, the cryptographic operation may utilize a cryptographic key. For example, a private key may be used to decrypt data that has been encrypted (e.g., ciphertext) or to provide a digital signature for authenticating the identity of a sender of a digital message. The application may store the private key to be used for a performance of a subsequent cryptographic operation.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
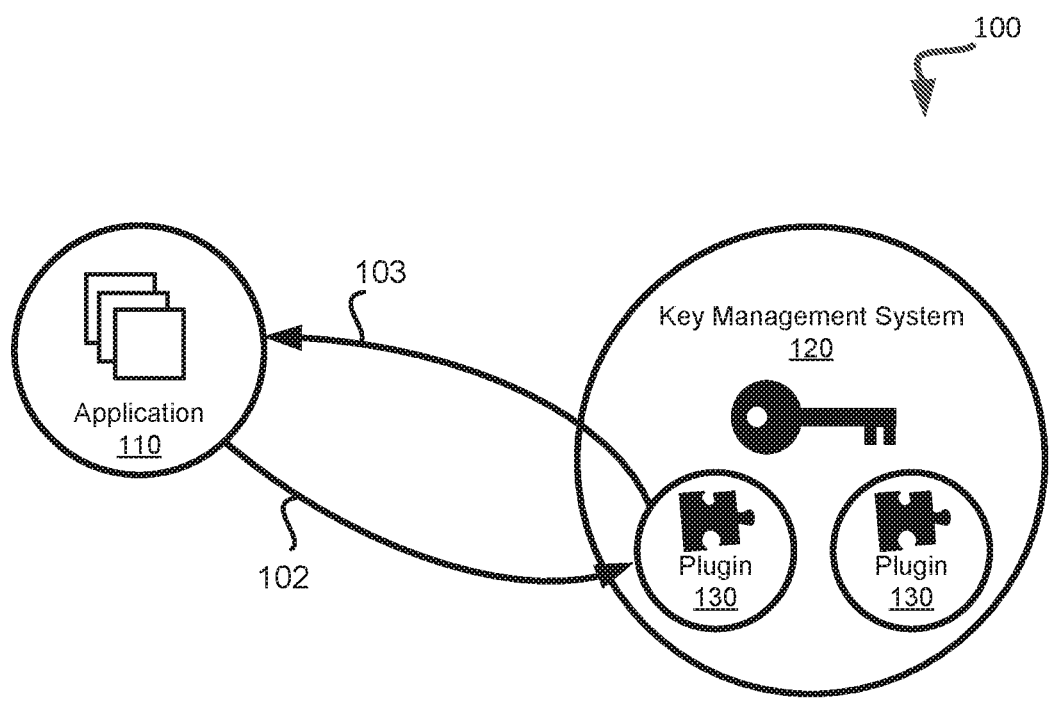
FIG. 1 illustrates an example environment to provide a runtime encryption plugin in accordance with some embodiments.

Aspects of the present disclosure relate to a runtime encryption plugin for a key management system. In general, an application may utilize a cryptographic key to perform a cryptographic operation. Such operations may include, but are not limited to, encrypting data, decrypting data, generating a cryptographic signature, verifying a cryptographic signature, etc. The application may operate on a network server and may request and receive the cryptographic key from a key management system at another network server. Such a key management system may be any system that stores multiple cryptographic keys for various applications. The key management system may transmit a requested cryptographic key to the application. For example, the cryptographic key may be transmitted over a network to the network server that is providing the application. Subsequently, the application may perform the cryptographic operation by utilizing the received cryptographic key.

The performing of the cryptographic operation with the cryptographic key by the application on the network server may expose the cryptographic key to security vulnerabilities. For example, the cryptographic key may not be securely stored at the network server so that an unauthorized entity (e.g., a malware application) may retrieve the cryptographic key stored at the network server and may subsequently perform cryptographic operations with the cryptographic key. As a result, the cryptographic key for use by the application may be exposed to an unauthorized entity to perform the cryptographic operations used by the application. Instead, the key management system may perform the cryptographic operations requested by the application. For example, instead of transmitting the cryptographic key to the network server providing the application, the application may transmit data to the key management system so that the key management system may use the cryptographic key that it is storing with the data received from the application to generate an output. Subsequently, the output may be returned to the application.

However, an operation requested to be performed by the application may include multiple sub-operations. For example, a cryptographic operation may be performed by a first sub-operation that uses a cryptographic key to generate an intermediate output and a second sub-operation may use the intermediate output and/or a cryptographic key to generate an output of the cryptographic operation. If the key management system transmits the intermediate output to the application, then an unauthorized entity may retrieve the intermediate output, thereby resulting in susceptibility of the cryptographic operation to the unauthorized entity that may compromise the security of the cryptographic operation. Furthermore, the use of the cryptographic keys may be intended to be restricted to particular conditions. For example, a particular cryptographic key may be used in particular types of cryptographic operations or with particular types of data. Other such functionality associated with the cryptographic keys may be desired.

Aspects of the present disclosure address the above and other deficiencies by providing runtime encryption plugins for the key management system. Such plugins may be program components of the key management system that are operated within a sandbox of the key management system. For example, the plugins may be provided in a computing environment with less permissions than that of the key management system. Such an environment may limit access of a corresponding plugin to the cryptographic keys assigned to the plugin. The plugins may provide functionality associated with the cryptographic keys for use with applications.

As an example, the key management system may include different types of such plugins. A first type of plugin may perform a cryptographic operation within a secure enclave of the key management system. Thus, if the cryptographic operation is performed based on multiple sub-operations, a corresponding intermediate output may not be transmitted from the secure enclave of the key management system. Instead, the plugin may continue to perform the various sub-operations until the last output for the cryptographic operation is obtained and the last output may then be returned to the application that requested the performance of the cryptographic operation. The first type of plugin may thus perform the cryptographic operation on behalf of the requesting application.

Additionally, a second type of plugin may use cryptographic keys based on one or more conditions assigned to the cryptographic keys. For example, a particular cryptographic key may be assigned to the second type of plugin that enforces one or more conditions to the use of the particular cryptographic key. When an application requests the performance of a cryptographic operation using the particular cryptographic key, the second type of plugin may perform the cryptographic operation with the particular cryptographic key if the one or more conditions are satisfied. Otherwise, the cryptographic operation may not be performed. Other types of plugins may also be used. For example, a third type of plugin such as a custom plugin may be used to provide various customized cryptographic operations.

Advantages of the present disclosure include, but are not limited to, the addition of functionality to a key management system to perform more robust and secure cryptographic operations for applications within the secure enclave or secure boundary of the key management system. Furthermore, the various plugins of the key management system may operate within a sandbox of the key management system, thereby resulting in the corresponding plugins being limited to accessing of other resources of the key management system. Thus, the use of the plugins within a key management system may allow for different functions of the cryptographic keys to be added or removed and to be performed within the secure enclave of the key management system.

FIG. 1 illustrates an example environment 100 to provide a runtime encryption plugin. The environment 100 may correspond to network servers that provide an interaction between an application and a key management system with runtime encryption plugins.

As shown in FIG. 1, the environment 100 may correspond to a network cluster or a data center. For example, a first network server may provide applications 110 and a second network server may provide a key management system 120. In some embodiments, a same network server may provide both the applications 110 and the key management system 120. In some embodiments, the second network server that is providing the key management system 120 may be external from a data center that includes the first network servers that provides the applications 110.

As shown in FIG. 1, a network connection may couple the applications 110 with the key management system 120. Furthermore, the key management system 120 may be a software or hardware resource that stores cryptographic keys as described in further detail below. Thus, the key management system 120 may store and manage cryptographic keys for use by different applications 110 that are provided by different network servers. The key management system 120 may include one or more plugins 130 that provide additional functionality to the key management system 120. For example, each of the plugins 130 may provide an additional feature for performing a cryptographic operation using cryptographic keys that are stored at the key management system 120. Further details with regards to the plugins 130 are described in conjunction with FIGS. 2-5.

The applications 110 may interact with the key management system 120. For example, the applications 110 may provide a request 102 for a cryptographic operation to be performed by the key management system 120. The request 102 may identify a particular plugin 130 that is currently provided by the key management system 120. In response to receiving the request, the plugin 130 that is identified by the request may perform one or more operations corresponding to the requested cryptographic operation. After performing the one or more operations, a result 103 from the cryptographic operation may be provided to the application 110 based on the operations of the corresponding plugin 130.

Figure 2:
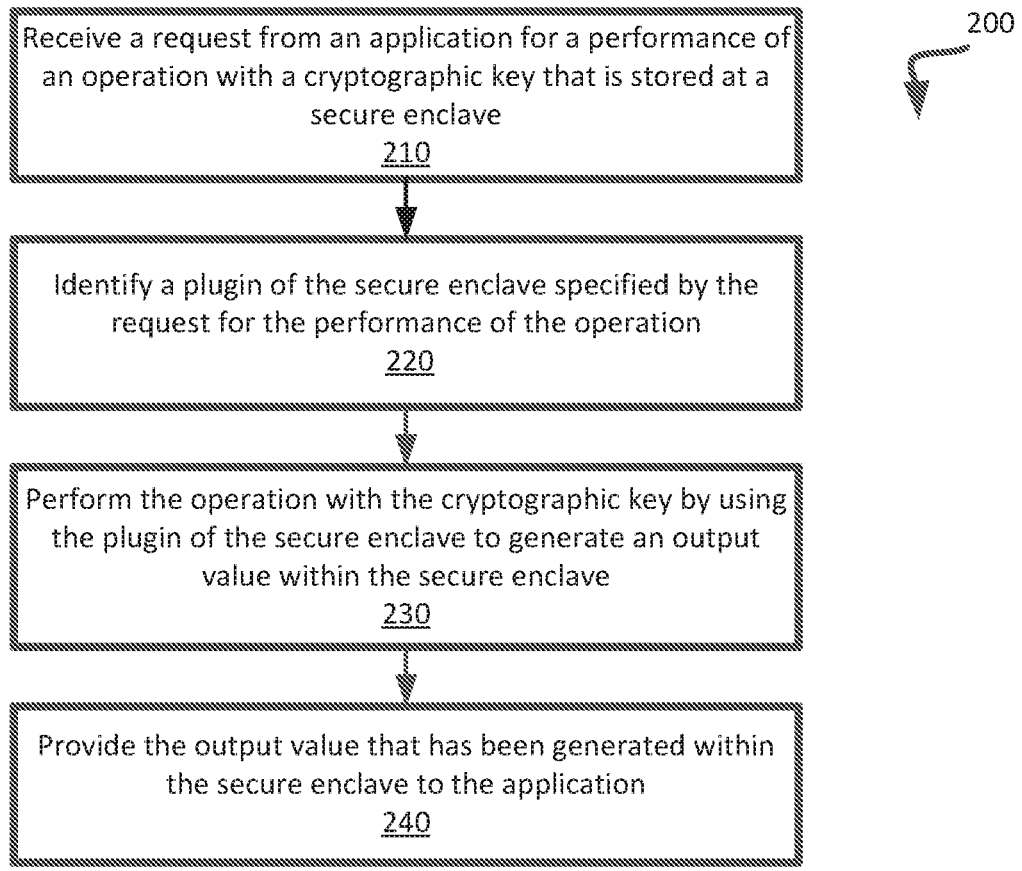
FIG. 2 illustrates a flow diagram of an example method to use a runtime encryption plugin of a key management system in accordance with some embodiments of the present disclosure.

FIG. 2 illustrates a flow diagram of an example method 200 to use a runtime encryption plugin of a key management system. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by a plugin 130 and/or a key management system 120 of FIG. 1.

For simplicity of explanation, the methods of the present disclosure are depicted and described as a series of acts. However, acts in accordance with the present disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 2, the method 200 may begin with the processing logic receiving a request from an application for a performance of an operation associated with a cryptographic key that is stored at a secure enclave (block 210). For example, the request may identify a plugin from multiple plugins that are provided by a key management server. In some embodiments, the request may further provide an input to the identified plugin. The input may correspond to data, a particular operation that is provided by the plugin and that is to use the data, a particular cipher mode, etc. For example, the operations may include, but are not limited to, encrypting the data, decrypting the data, generating a digital signature, verifying a digital signature, etc. In some embodiments, the operations may include generating a new cryptographic key, deleting an existing cryptographic key that is used by the identified plugin, etc. In some embodiments, the request from the application may be received via a representational state transfer (REST) application programming interface (API).

The processing logic may further identify a plugin of the secure enclave specified by the request for the performance of the operation (block 220). For example, a plugin that corresponds to the request may be identified. The secure enclave that includes the plugin may correspond to an isolated region of code and data within an address space of the key management system. In some embodiments, the plugin may be operated within a sandbox environment of the key management system so that the sandbox environment is assigned fewer privileges to resources of a computing system than that of the key management system.

Referring to FIG. 2, the processing logic may perform the operation with the cryptographic key by using the plugin included in the secure enclave to generate an output value within the secure enclave (block 230). For example, the requested operation may be performed within the secure enclave by the plugin that has been specified by the request to generate the output value. Thus, the requested operation or sub-operations of the requested operation may be performed within the secure enclave so that any intermediate data associated with the performance of the requested operation is not transmitted from the secure enclave. The processing logic may subsequently provide the output value that has been generated within the secure enclave to the application (block 240). For example, the output value may be transmitted from the secure enclave to the application.

Figure 3:
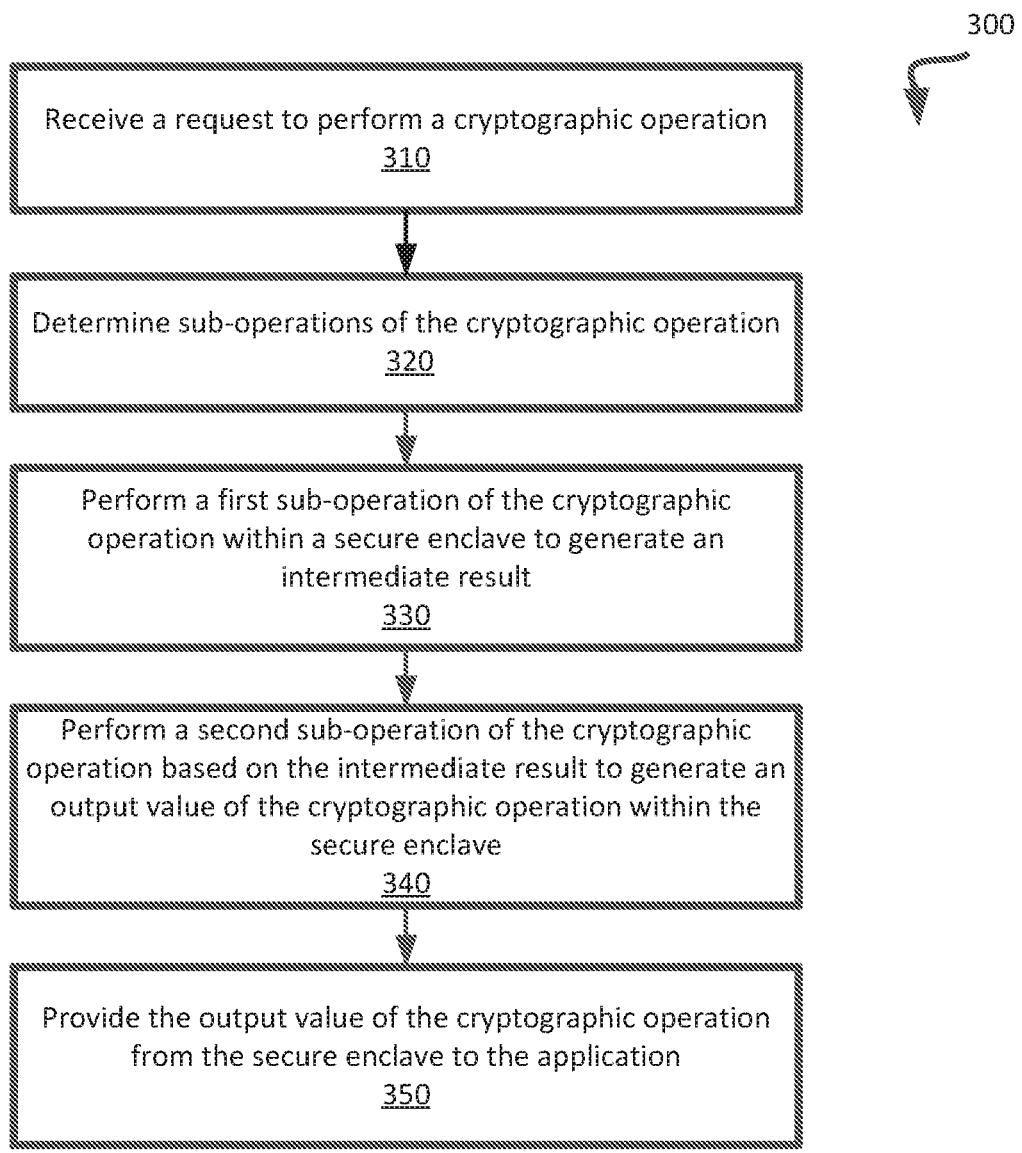
FIG. 3 illustrates a flow diagram of an example method to perform operations within a secure enclave by using a runtime encryption plugin of the key management system in accordance with some embodiments.

FIG. 3 illustrates a flow diagram of an example method 300 to perform operations within a secure enclave by using a runtime encryption plugin of the key management system. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by a plugin 130 and/or a key management system 120 of FIG. 1.

The method 300 may be performed by a particular plugin that performs a cryptographic operation on behalf of an application that is requesting the cryptographic operation. For example, the plugin may be associated with the same permissions or privileges as the application requesting the cryptographic operation. As shown in FIG. 3, the method 300 may begin with the processing logic receiving a request to perform a cryptographic operation (block 310). For example, a plugin may be identified to perform the cryptographic operation with a cryptographic key. The processing logic may further determine sub-operations of the cryptographic operation (block 320). The cryptographic operation may be performed by multiple operations. For example, the cryptographic operation may correspond to deriving a cryptographic key, encrypting data with the derived cryptographic key, and then deleting the cryptographic key, and returning the encrypted data. Thus, the steps used to perform the cryptographic operation to generate a final result of the cryptographic operation may be identified. The processing logic may subsequently perform a first sub-operation of the cryptographic operation within a secure enclave to generate an intermediate result (block 330) and may perform a second sub-operation of the cryptographic operation based on the intermediate result to generate an output value of the cryptographic operation within the secure enclave (block 340). For example, each of the sub-operations of the cryptographic operation may be performed within the secure enclave so that intermediate data from one of the sub-operations that is used by a subsequent sub-operation is retained within the secure enclave and does not exit or is not transmitted from the secure enclave. Subsequently, the processing logic may provide the output value of the cryptographic operation from the secure enclave to the application (block 350). For example, the output of the final sub-operation may be transmitted from the secure enclave to the application for use by the application.

As another example, the cryptographic operation may correspond to an envelope encryption operation that includes sub-operations of encrypting data with an asymmetric cryptographic key, generating a symmetric cryptographic key, and encrypting the symmetric cryptographic key with the asymmetric cryptographic key. Any other such combination of operations to complete a cryptographic operation may be performed. Thus, multiple operations may be completed in a batch from the application to be performed within the secure enclave by the plugin. Since the operations are performed in a batch instead of being repeatedly transmitted from the application to the plugin, latency may be less of a factor to complete the cryptographic operation and the intermediate data may be secure as the intermediate data is not transmitted from the secure enclave.

Figure 4:
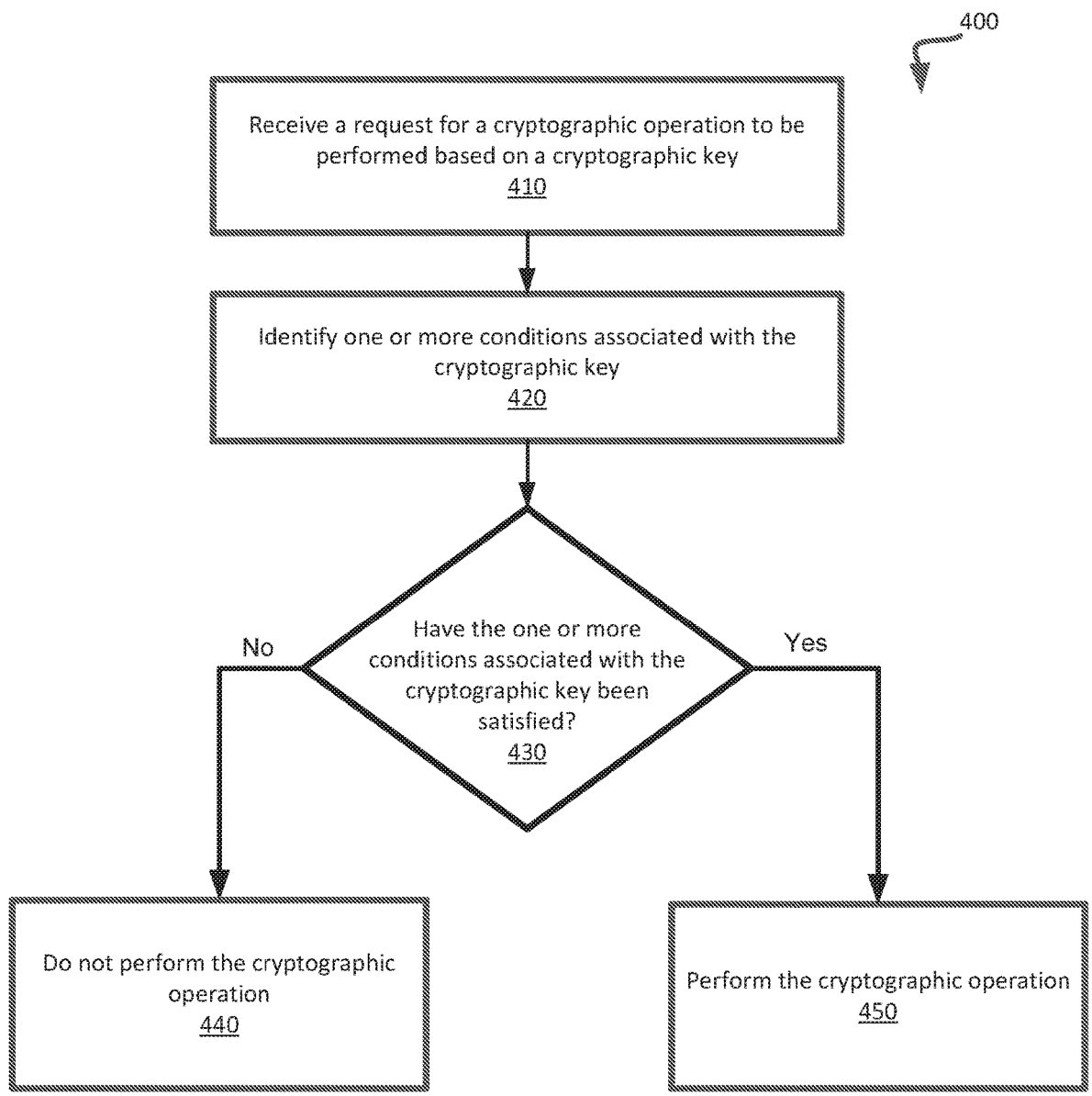
FIG. 4 illustrates a flow diagram of an example method to perform a cryptographic operation with a cryptographic key based on conditions associated with the cryptographic key in accordance with some embodiments of the present disclosure.

FIG. 4 illustrates a flow diagram of an example method 400 to perform a cryptographic operation with a cryptographic key based on conditions associated with the cryptographic key. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by a plugin 130 and/or a key management system 120 of FIG. 1.

The method 400 may be performed by a type of plugin that performs a cryptographic operation with a cryptographic key based on one or more conditions associated with the cryptographic key being satisfied. As shown in FIG. 4, the method 400 may begin with the processing logic receiving a request for a cryptographic operation to be performed based on a cryptographic key (block 410). The processing logic may subsequently identify one or more conditions associated with the cryptographic key (block 420). For example, a condition that is to be satisfied in order for the cryptographic operation to be performed with the cryptographic key may be identified. Such conditions may include, but are not limited to, a number of times that the cryptographic key has been used in a cryptographic operation, the number of times that the cryptographic key has been used in a particular period of time, a type of cryptographic operation that is to use the cryptographic key, whether a response has been received from an external network server associated with a third party, a type of data that is to be used in the cryptographic operation that is to use the cryptographic key, etc. In some embodiments, the condition may correspond to such actions that are performed by the plugin (e.g., a number of times that the cryptographic key has been used by the particular plugin, a number of cryptographic operations that the plugin has performed, a number of cryptographic operations that the plugin has performed for a particular application out of multiple applications, a number of times a particular cryptographic key has been used in an operation requested by a particular application with the particular plugin, etc.).

The processing logic may further determine whether the one or more conditions associated with the cryptographic key have been satisfied (bloc 430). If the one or more conditions have been satisfied, then the processing logic may perform the cryptographic operation (block 450). Otherwise, if any of the one or more conditions have not been satisfied, then the processing logic may not perform the cryptographic operation (block 440). In some embodiments, a notification message may be provided to the application indicating that the cryptographic operation was not performed and/or may indicate the condition that was not satisfied.

As an example, if the number of times that the cryptographic key has been used in any cryptographic operation exceeds a threshold number, then the cryptographic key may not be used in the cryptographic operation. If the number of times that the cryptographic key has been used does not exceed the threshold number, then the cryptographic key may be used in the cryptographic operation. Furthermore, if the number of items that the cryptographic key has been used in a threshold period of time exceeds a threshold number, then the cryptographic key may not be used and if the number of times that the cryptographic key has been used in the threshold period of time does not exceed the threshold number, then the cryptographic key may be used in the cryptographic operation. If the cryptographic operation is a type of operation that is not to be used with the cryptographic key, then the cryptographic operation may not be performed. For example, the cryptographic key may be associated with a condition that specifies that the cryptographic key may be used to encrypt data but may not be used to generate a digital signature. The condition associated with the cryptographic key may further specify the type of data that is to be used in the cryptographic operation with the cryptographic key. For example, the cryptographic key may not be used to sign particular types or formats of data and may be used to sign other types or formats of data. Similarly, the cryptographic key may be used in a particular cipher mode and may not be used in another type of cipher mode. Furthermore, for a condition that corresponds to whether a response has been received from an external network server associated with a third party, the cryptographic key may be used when the external network server provides the response and the cryptographic key may not be used when the external network server does not provide the response. In some embodiments, the external network server may be provided a request to provide the response in response to the application providing the request to the plugin of a key management system. The request to the external network server may indicate an identification of the application, a host system providing the application, and/or a user of the application. The external network server may subsequently provide a response based on the received information. The cryptographic key may be used if the response from the external network server satisfies a condition associated with the cryptographic key.

In some embodiments, other operations provided by plugins may correspond to various cipher modes (e.g., Advanced Encryption Standard (AES) with format-preserving encryption (FPE)), providing a serial number when generating a digital signature with a cryptographic key (e.g., a serial number assigned to the plugin), certificate transparency, key rotation operations (e.g., decrypting prior encrypted data and then re-encrypting the resulting data with a new cryptographic key), and other custom cryptographic operations that may be based on one or more operations that are provided by the key management system.

Figure 5:
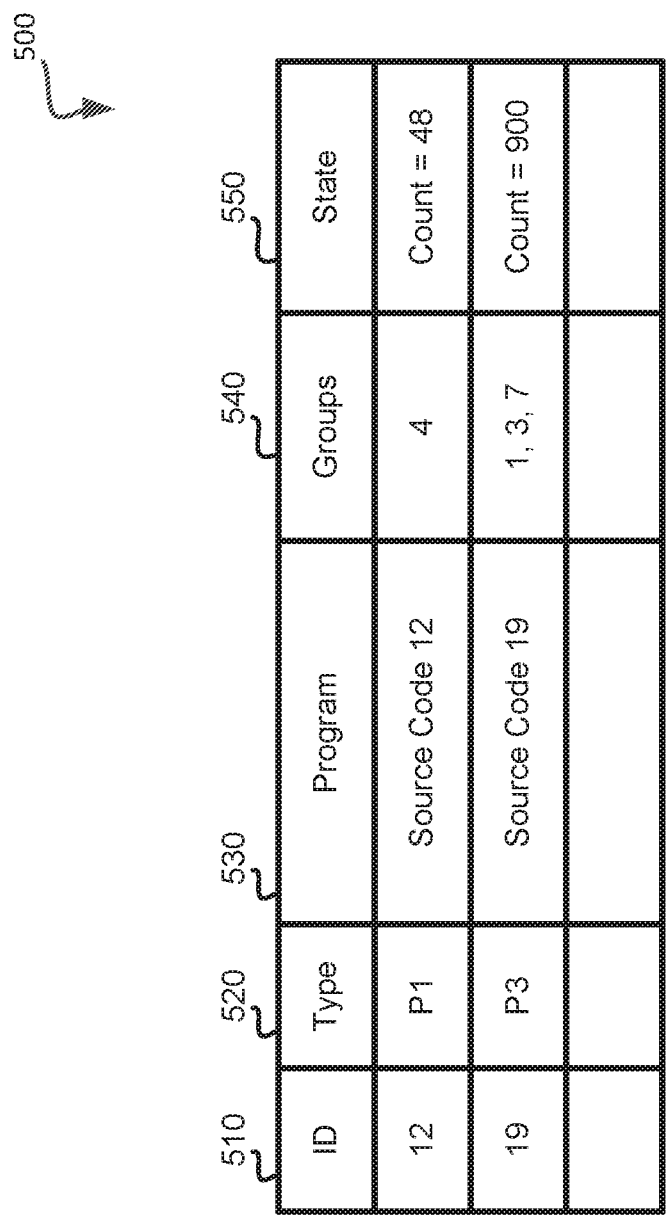
FIG. 5 illustrates a data structure that includes information for runtime encryption plugins of the key management system in accordance with some embodiments of the present disclosure.

FIG. 5 illustrates a data structure 500 that includes information for runtime encryption plugins of the key management system. In general, the data structure 500 may be generated or used by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, data structure 500 may be generated or used by a plugin 130 and/or a key management system 120 of FIG. 1.

As shown in FIG. 5, the data structure 500 may include entries (e.g., a row) for each plugin that is provided by the key management system. For example, the data structure 500 may include a column 510 that provides an identification of a plugin, a column 520 that identifies a type of the plugin, a column 530 that may store or indicate a location of program code that implements the plugin, a column 540 that indicates groups associated with the plugin, and a column 550 that indicates state data for a plugin.

The column 520 that identifies the type of a plugin may indicate whether the plugin is a type of plugin associated with a plugin that performs operations on behalf of an application (e.g., as described in conjunction with FIG. 3), a type of plugin that applies conditions to cryptographic keys (e.g., as described in conjunction with FIG. 4), or a custom plugin. The column 530 may include the program source code of a plugin or may indicate a location of the source code of the plugin (e.g., a location of the address space associated with the secure enclave that provides the sandbox environment of the plugin). Furthermore, the column 540 indicates one or more groups that may be associated with the plugin. For example, a group may indicate particular applications that may be able to use the plugin (e.g., whether the plugin is accessible to a particular application or a user of the application) and/or particular cryptographic keys of the key management system that may be accessible and used by the plugin to perform a cryptographic operation. As shown, the column 540 may indicate different groups of users, applications, and cryptographic keys that may be assigned to a particular plugin.

Referring to FIG. 5, the column 550 may identify state data of a plugin. The state data may indicate information associated with the plugin. For example, the state data may indicate a number of times that the plugin has been used, a number of times that the plugin has performed a particular type of cryptographic operation, a number of cryptographic keys accessed or used by the plugin, or other such characteristics that identify a use of the plugin by applications.

In some embodiments, the data structure 500 may be stored in the secure enclave corresponding to the key management system.

Furthermore, each of the plugins may be provided to the key management system from an entity (e.g., another user or author) that provides source code corresponding to a plugin to be used by other users. For example, an author may provide a plugin that may be selected by a user of the key management system as a plugin that may be used with cryptographic keys. In some embodiments, the entity providing the source code of the plugin may further provide instructions or documentation relating to the provided plugin. The user of the key management system may select the plugin to be imported or used by the key management system. Subsequently, the user of the key management system may specify one or more groups that are to be assigned to the plugin that has been imported. As a result, an additional entry or row of the data structure 500 may be generated when the plugin is imported into the key management system.

Figure 6:
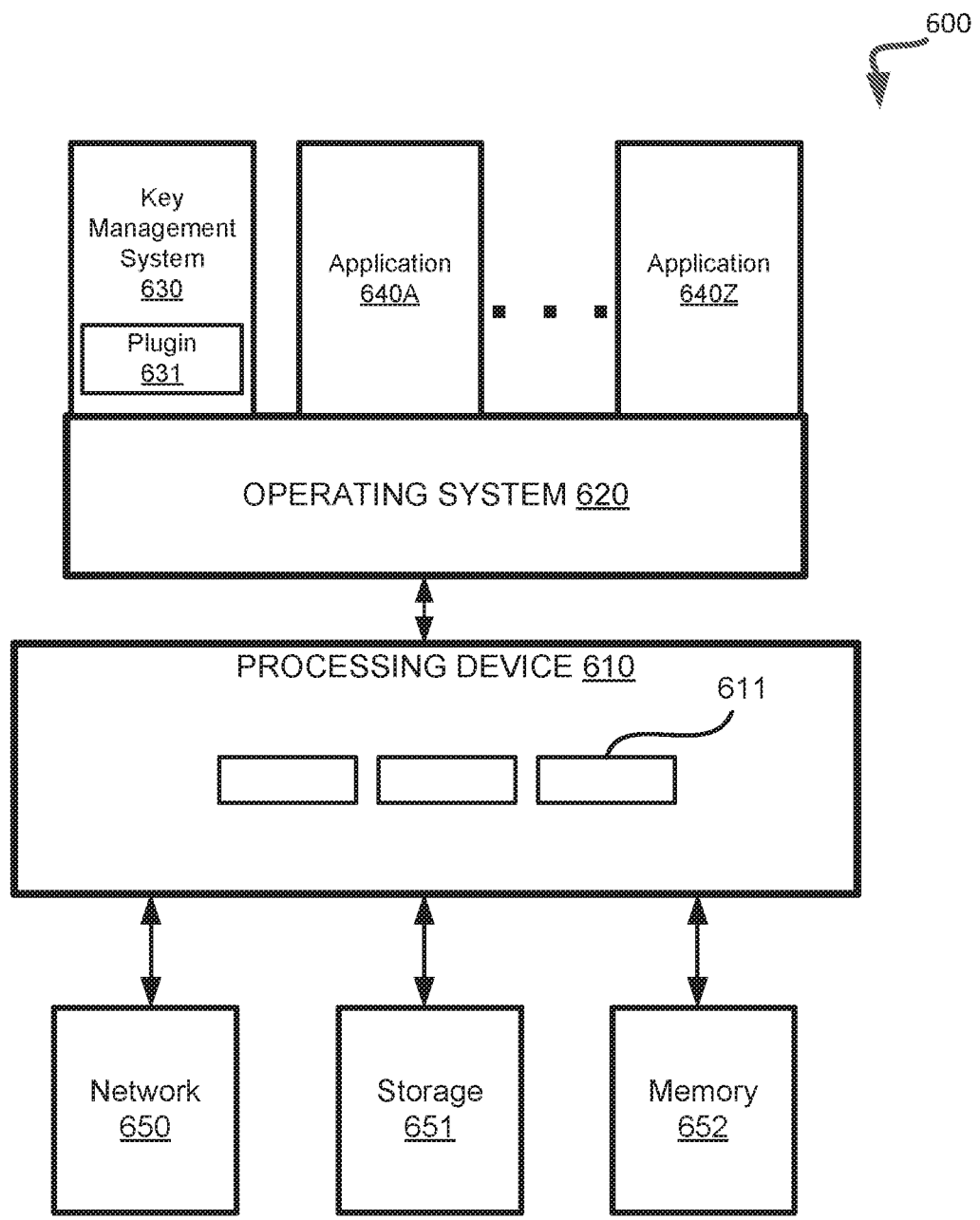
FIG. 6 illustrates an example network server with a runtime encryption plugin for a key management system to provide secure use of a cryptographic key for one or more applications in accordance with some embodiments of the present disclosure.

FIG. 6 illustrates an example network server 600 with a runtime encryption plugin for a key management system to provide secure use of a cryptographic key for one or more applications. In general, a plugin 631 may be hosted by a network server to provide cryptographic operations for one or more other applications 640A to 640Z that are also hosted by the network server or another network server. The plugin 631 may correspond to a plugin 130 of FIG. 1. Furthermore, the plugin 631 may be provided by a key management service 630.

As shown in FIG. 6, the network server 600 may include a processing device 610 that may execute an operating system 620. Furthermore, the processing device 610 may include one or more internal cryptographic keys 611 that may be used to encrypt and decrypt data stored in a portion of a memory that is assigned to a secure enclave of the key management system 630. The access to the data of the key management system 630 in the secure enclave (e.g., data stored at a storage resource) may be protected from the one or more applications 640A to 640Z and the operating system 620. For example, the access to the data of the secure enclave corresponding to the key management system 630 may be protected by the use of one of the internal cryptographic keys 611 that are internal to the processing device 610 so that the access to the data is based on a hardware access as opposed to a software access. The operating system 620 may be associated with a first privilege level and the key management system 630 and the applications 640A to 640Z may be associated with a second privilege level where the first privilege level of the operating system is more privileged than the second privilege level of the various applications that are run on the operating system 620 (e.g., the more privileged level allows access to more resources of the network server than the less privileged level). Thus, the operating system 620 may be allowed access to resources of the applications 640A to 640Z. However, since the key management system 630 is assigned to a secure enclave where access to the data of the secure enclave is based on the use of an internal cryptographic key 611 of the processing device 611, the operating system 620 may not be able to access the data of the key management system 630 despite having a more privileged level of access than the key management system 630. The master key that is used to decrypt data at the storage resource may be an internal cryptographic key 611.

In operation, the key management system 630 may be hosted on the network server with the applications 640A to 640Z. The application 640A may perform a function that may use a cryptographic operation with a cryptographic key. In order to securely store the cryptographic key and perform the cryptographic operation securely, the application 640A may establish a connection with the key management system 630. For example, an attestation procedure may be performed by the application 640A to authenticate the key management system 630. After the key management system 630 has been authenticated, a connection may be considered to be established between the application 640A and the key management system 630. The cryptographic key of the application 640A (e.g., used by cryptographic operation) may be provided to the key management system 630. Since the key management system 630 is assigned to a secure enclave, the data of the key management system 630 may be encrypted and protected by the use of an internal cryptographic key 611 (i.e., the master key) of the processing device 610. For example, the key management system 630 may receive the cryptographic key of the application 640A and may transmit an instruction to the processing device 610 to store the received cryptographic key in the memory of its assigned secure enclave. In some embodiments, the key management system 630 may transmit identification information of the key management system 630 to the processing device 610 for the processing device 610 to load the received cryptographic key from the application 640A in the secure enclave of the key management system 630. The processing device 610 may use an instruction to use one of its internal cryptographic keys 611 that is based on the identification of the key management system 630 to store the received cryptographic key in the memory of the secure enclave of the key management system 630. For example, the received cryptographic key may be securely (e.g., encrypted) stored in the storage 651 or memory 652 associated with the processing device 610 or at another storage resource over a network 650 (e.g., at a storage device of the storage resource). In some embodiments, one of the applications 640A to 640Z may provide a request to the key management system 630 to generate a cryptographic key to be used in a cryptographic operation for the respective application 640A to 640Z. For example, the key management system 630 may generate the cryptographic key and may store the cryptographic key in its memory of the secure enclave.

After the cryptographic key of the application 640A has been loaded in the secure enclave, the application 640A may subsequently request for a cryptographic operation to be performed with its cryptographic key. For example, the application 640A may provide a request to the key management system 630 that identifies the cryptographic operation to be performed. The key management system 630 may subsequently use an instruction so that the processing device 610 may use one of its internal cryptographic keys 611 that is based on the identification of the key management system 630 to decrypt the data of the secure enclave of the key management system 630 and to retrieve the cryptographic key. Subsequently, the cryptographic operation may then be performed (e.g., data may be decrypted or data may be signed by using the retrieved cryptographic key) by the processing device 610 and then the output of the cryptographic operation may be provided to the key management system 630 which may return the output to the application 240A. In some embodiments, the internal cryptographic key 611 may be combined with additional information (e.g., the identification information of the key management system 630) to generate the master key for the key management system 630 that is used to decrypt and/or encrypt data associated with the secure enclave of the key management system 630. Thus, since the processing device 610 uses its internal cryptographic key 611 to decrypt data and to perform the cryptographic operation, the cryptographic key received from the application may not be exposed external to the processing device 610.

As such, a network server may run a key management system 630 and an application that may use the key management system 630 for storing or loading keys and managing the use of the keys. Although FIG. 6 illustrates that the key management system 630 may provide secure key management for an application 640A to 640Z on the same network server, the key management system 630 may alternatively be hosted by another network server or may be hosted by another network server that is external to any data center or network cluster that includes the network servers hosting applications 640A to 640Z.

Figure 7:
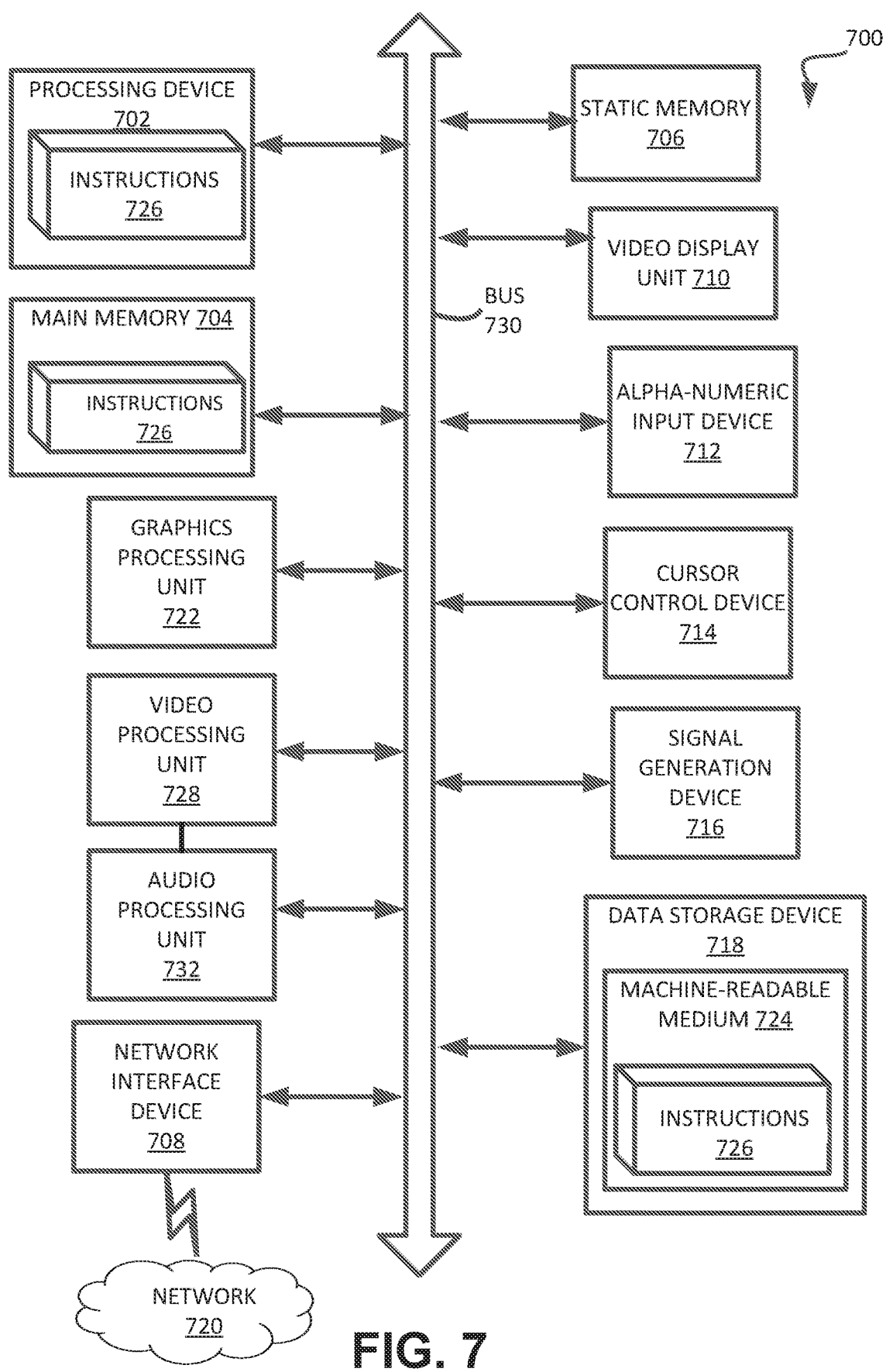
FIG. 7 illustrates an example computer system in which embodiments of the present disclosure operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to a plugin of a key management system. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
receiving, by a key management system executing on a computer system, a request from an application for a performance of an operation associated with a cryptographic key that is stored at a secure enclave;
identifying, by a processing device, a plugin of the secure enclave specified by the request for performance of the operation, wherein the plugin executes within a sandbox environment of the key management system, and wherein the sandbox environment is assigned fewer privileges than the key management system to access resources of the computer system;
performing the operation associated with the cryptographic key by using the plugin of the secure enclave to generate an output within the secure enclave, wherein the performing of the operation associated with the cryptographic key is further based on one or more conditions identified by the plugin for the cryptographic key associated with the operation, wherein at least one of the conditions corresponds to an action performed by the plugin;
in response to the performing of the operation associated with the cryptographic key by using the plugin of the secure enclave, updating, at the secure enclave, state information of the plugin based on the operation associated with the cryptographic key, wherein the state information comprises at least one characteristic that identifies a use of the plugin by the application; and
providing the output generated within the secure enclave and based on the plugin to the application.

2. The method of claim 1, wherein the performing of the operation associated with cryptographic key by using the plugin comprises:
determining a plurality of sub-operations that correspond to the operation associated with the cryptographic key;
performing a first sub-operation of the plurality of sub-operations based on the cryptographic key to generate an intermediate output, wherein the intermediate output is not transmitted from the secure enclave; and
performing a second sub-operation of the plurality of sub-operations based on the intermediate output to generate the output within the secure enclave.

3. The method of claim 1, further comprising:
determining whether the one or more conditions identified by the plugin have been satisfied, wherein the output that is generated within the secure enclave corresponds to a respective output of the operation associated with the cryptographic key when the one or more conditions have been satisfied.

4. The method of claim 1, wherein the one or more conditions correspond to a number of times that the cryptographic key has been used in operations, a type of a second operation that is to be performed, a type of data to be used in the performance of the second operation, or an indication of whether a response has been received from an external network server.

5. The method of claim 1, wherein access to one or more cryptographic keys by the plugin is limited to at least one cryptographic key assigned to the plugin.

6. The method of claim 1, wherein the state information of the plugin identifies one or more of: a number of cryptographic keys accessed or used by the plugin, or a number of times the plugin has performed a particular type of cryptographic operation.

7. The method of claim 1, wherein the state information of the plugin is represented by a data structure that associates each plugin provided by the key management system with corresponding state information.

8. The method of claim 1, wherein the at least one of the conditions corresponds to a number of times that the cryptographic key has been used by the plugin.

9. The method of claim 1, wherein the at least one of the conditions corresponds to a number of cryptographic operations that the plugin has performed.

10. The method of claim 1, wherein the at least one of the conditions corresponds to a number of cryptographic operations that the plugin has performed for a particular application of a plurality of applications.

11. A system comprising:
a memory; and
a processing device, operatively coupled with the memory, to:
receive, by a key management system executing on a computer system, a request from an application for a performance of an operation associated with a cryptographic key that is stored at a secure enclave;
identify a plugin of the secure enclave specified by the request for performance of the operation, wherein the plugin executes within a sandbox environment of the key management system, and wherein the sandbox environment is assigned fewer privileges than the key management system to access resources of the computer system;
perform the operation associated with the cryptographic key by using the plugin of the secure enclave to generate an output within the secure enclave, wherein the performing of the operation associated with the cryptographic key is further based on one or more conditions identified by the plugin for the cryptographic key associated with the operation, wherein at least one of the conditions corresponds to an action performed by the plugin;
in response to the performing of the operation associated with the cryptographic key by using the plugin of the secure enclave, update, at the secure enclave, state information of the plugin based on the operation associated with the cryptographic key, wherein the state information comprises at least one characteristic that identifies a use of the plugin by the application; and
provide the output generated within the secure enclave and based on the plugin to the application.

12. The system of claim 11, wherein to perform the operation associated with cryptographic key by using the plugin, the processing device is further to:
determine a plurality of sub-operations that correspond to the operation associated with the cryptographic key;
perform a first sub-operation of the plurality of sub-operations based on the cryptographic key to generate an intermediate output, wherein the intermediate output is not transmitted from the secure enclave; and
perform a second sub-operation of the plurality of sub-operations based on the intermediate output to generate the output within the secure enclave.

13. The system of claim 11, wherein the processing device is further to:

determine whether the one or more conditions identified by the plugin have been satisfied, wherein the output that is generated within the secure enclave corresponds to a respective output of the operation associated with the cryptographic key when the one or more conditions have been satisfied.

14. The system of claim 11, wherein the one or more conditions correspond to a number of times that the cryptographic key has been used in operations, a type of a second operation that is to be performed, a type of data to be used in the performance of the second operation, or an indication of whether a response has been received from an external network server.

15. The system of claim 11, wherein access to one or more cryptographic keys by the plugin is limited to at least one cryptographic key assigned to the plugin.

16. The system of claim 11, wherein the state information of the plugin identifies one or more of: a number of cryptographic keys accessed or used by the plugin, or a number of times the plugin has performed a particular type of cryptographic operation.

17. The system of claim 11, wherein the state information of the plugin is represented by a data structure that associates each plugin provided by the key management system with corresponding state information.

18. A non-transitory computer readable medium comprising data that, when accessed by a processing device, cause the processing device to perform operations comprising:
   receiving, by a key management system executing on a computer system, a request from an application for a performance of an operation associated with a cryptographic key that is stored at a secure enclave;
   identifying a plugin of the secure enclave specified by the request for performance of the operation, wherein the plugin executes within a sandbox environment of the key management system, and wherein the sandbox environment is assigned fewer privileges than the key management system to access resources of the computer system;
   performing the operation associated with the cryptographic key by using the plugin of the secure enclave to generate an output within the secure enclave, wherein the performing of the operation associated with the cryptographic key is further based on one or more conditions identified by the plugin for the cryptographic key associated with the operation, wherein at least one of the conditions corresponds to an action performed by the plugin;
   in response to the performing of the operation associated with the cryptographic key by using the plugin of the secure enclave, updating, at the secure enclave, state information of the plugin based on the operation associated with the cryptographic key, wherein the state information comprises at least one characteristic that identifies a use of the plugin by the application; and
   providing the output generated within the secure enclave and based on the plugin to the application.

19. The non-transitory computer readable medium of claim 18, wherein to perform the operation associated with cryptographic key by using the plugin, the operations further comprise:
   determining a plurality of sub-operations that correspond to the operation associated with the cryptographic key;
   performing a first sub-operation of the plurality of sub-operations based on the cryptographic key to generate an intermediate output, wherein the intermediate output is not transmitted from the secure enclave; and
   performing a second sub-operation of the plurality of sub-operations based on the intermediate output to generate the output within the secure enclave.

20. The non-transitory computer readable medium of claim 18, wherein the state information of the plugin is represented by a data structure that associates each plugin provided by the key management system with corresponding state information.

* * * * *